(12) United States Patent
Raskar et al.

(10) Patent No.: US 9,240,839 B2
(45) Date of Patent: Jan. 19, 2016

(54) TRANSMITTING DATA TO A ROLLING SHUTTER SENSOR ARRAY VIA A LIGHT EMITTER ARRAY

(71) Applicant: Nokia Corporation, Espoo (FI)

(72) Inventors: Ramesh Raskar, Cambridge, MA (US); Pranav Mishra, Bangalore (IN); Rajeswari Kannan, Bangalore (IN)

(73) Assignee: NOKIA CORPORATION, Espoo (FI)

( * ) Notice: Subject to any disclaimer, the term of this patent is extended or adjusted under 35 U.S.C. 154(b) by 66 days.

(21) Appl. No.: 14/149,479

(22) Filed: Jan. 7, 2014

(65) Prior Publication Data

US 2015/0195042 A1 Jul. 9, 2015

(51) Int. Cl.
| | |
|---|---|
| H04B 10/11 | (2013.01) |
| H04B 10/50 | (2013.01) |
| H04B 1/3827 | (2015.01) |
| H04B 10/114 | (2013.01) |

(52) U.S. Cl.
CPC .............. *H04B 10/502* (2013.01); *H04B 1/385* (2013.01); *H04B 10/11* (2013.01); *H04B 10/1141* (2013.01); *H04B 2001/3866* (2013.01)

(58) Field of Classification Search
None
See application file for complete search history.

(56) References Cited

U.S. PATENT DOCUMENTS

| | | | |
|---|---|---|---|
| 5,256,869 A | 10/1993 | Lin et al. | |
| 2004/0189474 A1 | 9/2004 | Borovoy et al. | |
| 2005/0178950 A1* | 8/2005 | Yoshida | 250/208.1 |
| 2005/0232628 A1* | 10/2005 | von Freyhold et al. | 398/41 |
| 2006/0018609 A1* | 1/2006 | Sonoda et al. | 385/93 |
| 2011/0129228 A1 | 6/2011 | McFadden | |
| 2011/0216792 A1 | 9/2011 | Chann et al. | |
| 2013/0094866 A1* | 4/2013 | Pasquero et al. | 398/202 |
| 2013/0195273 A1 | 8/2013 | Lord | |
| 2014/0086590 A1* | 3/2014 | Ganick et al. | 398/118 |
| 2014/0093234 A1* | 4/2014 | Roberts et al. | 398/25 |

FOREIGN PATENT DOCUMENTS

| | | |
|---|---|---|
| EP | 1439649 | 9/2002 |
| EP | 2503852 | 9/2012 |
| EP | 2582119 | 4/2013 |

OTHER PUBLICATIONS

Liu et al., "Adaptive Control of OFDM Data Rate for LED Visible Light Communications in Different Free Space Transmission Distances and Offsets", Asia Communications and Photonics Conference, Nov. 2013.
Danakis et al., "Using a CMOS Camera Sensor for Visible Light Communication", 3$^{rd}$ IEEE Workshop on Optical Wireless Communications, 5 pages.
Elgala et al., "OFDM Visible Light Wireless Communication Based on White LEDs", IEEE, 2007 5 pages.

* cited by examiner

*Primary Examiner* — Leslie Pascal
(74) *Attorney, Agent, or Firm* — Hollingsworth Davis, LLC (57) ABSTRACT

An array of light emitters is arranged single-file along an emitting surface of a transmitting device and emits light in a z-direction normal to the emitting surface. The array of light emitters is aligned along a y-direction normal to the z-direction. A lens assembly is optically coupled to the array of light emitters. The lens assembly includes at least one cylindrical lens and at least one aspherical lens. The lens assembly emits the light in free-space along the z-direction and has a first focal length in the y-direction and a different, second focal length in an x-direction. An encoder is coupled to apply a data signal to the array of light emitters. The data signal causes the array of light emitters to illuminate in a pattern that switches at a rate corresponding to a rolling shutter of a receiving sensor array.

20 Claims, 8 Drawing Sheets

TRANSMITTING DATA TO A ROLLING SHUTTER SENSOR ARRAY VIA A LIGHT EMITTER ARRAY

BACKGROUND

Optical field communications (OFC), or free-space optical communications (FSO) relates to the use of light propagating through free-space (e.g., air, vacuum, water) to communicate data between endpoints. This is in contrast to using a propagating media such as a waveguide or optic fiber to transmit optical data. While propagating media may offer high reliability and tighter control over the transmission, OFC communications do not require any physical coupling between endpoints, and so are useful in fields such as mobile and space communications.

SUMMARY

The present disclosure is related to systems and methods for transmitting data to a rolling shutter sensor array via a light emitter array. In one embodiment, a system includes an array of light emitters is arranged single-file along an emitting surface of a transmitting device and emits light in a z-direction normal to the emitting surface. The array of light emitters is aligned along a y-direction normal to the z-direction. A lens assembly is optically coupled to the array of light emitters. The lens assembly includes at least one cylindrical lens and at least one aspherical lens. The lens assembly emits the light in free-space along the z-direction and has a first focal length in the y-direction and a different, second focal length in an x-direction. An encoder is coupled to apply a data signal to the array of light emitters. The data signal causes the array of light emitters to illuminate in a pattern that switches at a rate corresponding to a rolling shutter of a receiving sensor array.

In another embodiment, a method involves encoding data onto a data signal and applying the data signal to cause an array of light emitters to illuminate in a pattern that changes at a rate corresponding to a rolling shutter of a receiving sensor array. The array of light emitters is arranged single-file along a y-direction of an emitting surface of a transmitting device and emits light in a z-direction normal to the emitting surface. The method involves directing the light from the array of light emitters through a lens assembly that comprises at least one cylindrical lens and at least one aspherical lens. The lens assembly emits the light in free-space along the z-direction and hasg a first focal length in the y-direction and a different, second focal length in an x-direction.

In another embodiment, a system and/or apparatus includes light emitting means for emitting light along an emitting surface of a transmitting device, the light emitted in a z-direction normal to the emitting surface along a single-file path that is aligned in a y-direction normal to the z-direction. The system and/or apparatus includes optical means for emitting the light in free-space along the z-direction such that the light has a first focal length in the y-direction and a different, second focal length in an x-direction. The system and/or apparatus includes encoding means for applying a data signal to cause the light emitting means to illuminate in a pattern that changes at a rate corresponding to a rolling shutter of a receiving sensor array.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

The present disclosure is related to systems, methods, and apparatuses that facilitate line-of-sight optical field communications (OFC) between personal user devices. While the present embodiments are described being used in personal and/or wearable devices, it will be understood that embodiments below may be used in a number of applications, such as billboards, automotive (e.g., car-to-car communications), location beacons, etc., which may or may not involve use of wearable devices.

Generally, a portable user device such as a wearable device (e.g., glasses, watch, hat, headphones, jewelry, etc.) or other mobile device (e.g., a smartphone) may include optical transmitters and/or receivers that facilitate point-to-point communications across a personal distance, e.g., a range of separation that is common in social situations, such as 0.5-3 meters. This is far enough to be convenient in a social setting, yet close enough to ensure communications remain private. The free space light delivery can be made directional to further enhance privacy, Examples of OFC devices are described herein below in the context of personal communications, which has certain aspects that make OFC communications desirable. For example, in a situation where users A, B, and C are sitting together, user A can transmit data (e.g., a file) to user C by looking at a device of user C (e.g., similar glasses that C is wearing, a smartphone of user C) and asking specially configured glasses (e.g., using voice, gesture) to transmit some information. The field of view may be restricted so that user B cannot receive the data unless user A is looking at B, or the field of view can be widened so that both can receive the data as long as user A is looking at both. No device pairing is needed (no user intervention on both ends for selection), and the selection of the target is made by looking at it.

While other types of communication may be used between wearable devices, there are differences in how these types of communication operate. For example, near-field communications (NFC) may be used in a similar scenario, but require devices to be in close proximity (e.g., a few cm) which may not be practical with devices such as glasses. Proximity networking (e.g., Bluetooth) may also be used, however usually requires a paring operation and selection of specific applications on both sides to perform a certain task, e.g., file transfer.

However, some features of OFC communications make them desirable in the context of wearable devices. For example, wearable devices have limited real estate on which to place transmitting devices, and so one goal of an OFC apparatus in such a case is to maximize the data transmitted from a minimum number of light emitters. In other applications where real estate is not an issue, a larger number of light emitters may be used. The light may be emitted in any wavelength, including infrared, visible, and ultraviolet.

Light emitters in the embodiments described below include light emitting diodes (LEDs), however other light emitter devices may be used, such as liquid crystal displays (LCD) and/or laser diodes. For example, future technology LCD panels may attain speeds of up to 25000 fps facilitating high speed data transfers. A single line LCD display of this type can be utilized to form a single line display. Such a display may require less space and/or power than LEDs.

Generally, OFC transmitting apparatuses described herein include an array of light emitting diodes (LEDs), at least part of which are arranged single-file along an emitting surface of the transmitting apparatus. For example, a set of LEDs may be aligned together along a single line or curve. Data is encoded and sent to the LEDs in a way that cause them to be turned on and off in a certain pattern. A receiving device (e.g., wearable device, mobile device, camera) includes a camera-type sensor that can detect and decode the data. This provides the capability to perform easy yet secure direct communication between peer devices.

Figure 1:
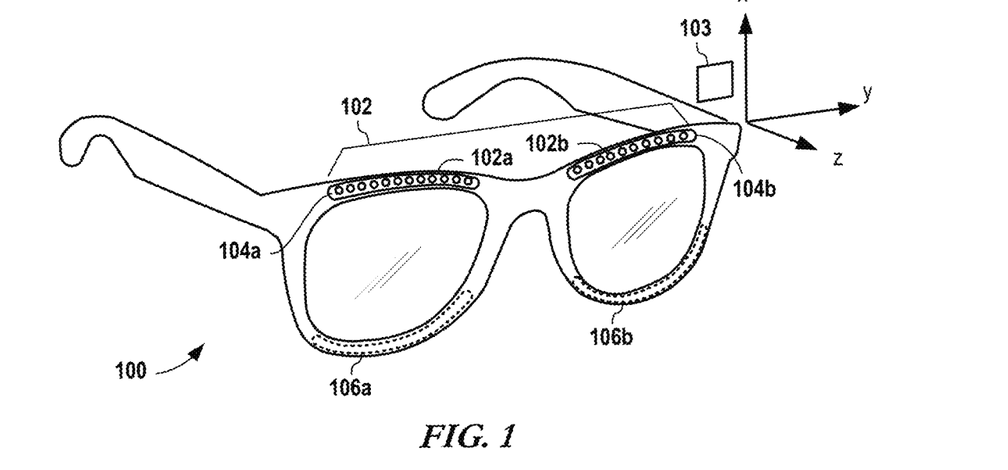
FIG. 1 is a perspective view illustrating a transmitting device according to an example embodiment.

An example of a data transmitting device is shown in the perspective view of FIG. 1. This device is configured as a pair of eyeglasses 100 that may include at least some active circuitry embedded within. The circuitry includes at least an array 102 of light emitters, in this case emitter rows 102a-b over each eyepiece. Each of the emitter rows 102a-b include independently activated light emitters, such as LEDs. The rows 102a-b may be along a straight line, a curve, or any other path that can approximated as a one-dimensional array. The rows 102a-b are approximately aligned along an emitting surface 103, which is defined here as an xy-parallel-plane. The xy-plane is at least tangent to the surface of the glasses frame where the rows 102a-b are attached, such that the light emitters of the rows 102a-b generally emit light in the z-direction, which is normal to the emitting surface 103.

Each light emitter of the array 102 may be configured to simultaneously transmit a different part of a data signal. For example, at an instant in time, any of the light emitters that are turned on can be interpreted as transmitting a one, and the other that are turned off are transmitting a zero. For purposes of this disclosure, simultaneous transmission will be understood to encompass a range of time during which data of the array 102 is read by a receiving device. As such, some amount of delay between activation or deactivation of individual array elements may still be considered simultaneous so long as the receiving device is able to read data from the array 102 over a defined time period.

Additional emitter arrays, such as optional array 106 that includes rows 106a-b, may be included in a location that is complementary to emitter array 102, e.g., at the bottom edge of each eyepiece. As will be described below, each light emitter from an upper row 102a-b may be synchronized with an aligned light emitter of the lower row 106a-b. This alignment would be along the x-axis, and light emitters aligned this way would activate or deactivate together. This would increase the field of view of the data transmitted via the arrays 102, 106. An increase in the number of single-file emitters in the arrays 102, 106 will increase an amount of data that can be transmitted, as each light emitter in an array 102, 106 can independently transmit a bit in parallel with other light emitters in the array 102, 106.

The emitter rows 102a-b also include lens assemblies 104a-b that emit light in free-space along the z-direction of the illustrated coordinate system. The lens assemblies 104a-b cause the emitted light to have a first focal length in the x-direction and a second focal length in the y-direction. For example, the lens assemblies could be configured so that the focus is at 3 m in the x-direction and at infinity in the y-direction. This may result in a large field of view in the x-direction and a small field of view in the y-direction, e.g., depending on the focus of the receiving device. For example, the smaller y-direction field of view may be obtained by focusing the receiving device in the x-direction range.

Figure 2:
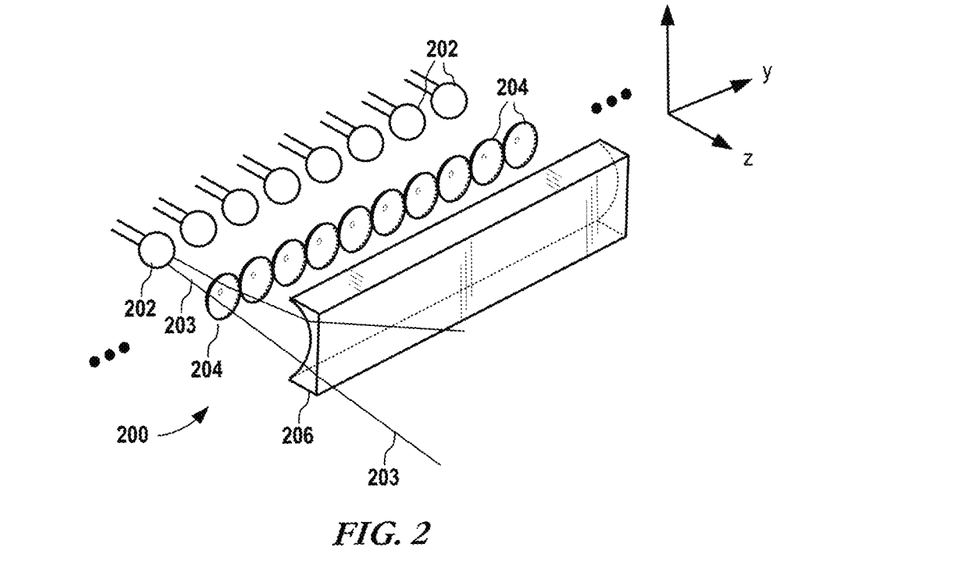
FIG. 2 is a perspective, exploded view show a light emitter array and lens assembly according to an example embodiment.

In FIG. 2, a diagram shows how an example of a lens assembly 200 that provides differing focal lengths in the x- and y-directions according to an example embodiment. Light 203 from an array of light emitters 202 is emitted at least in the z-direction through aspherical lenses 204 and cylindrical lens 206. In this example, a single aspherical lens 204 is provided for each of the LEDs 202. In other embodiments, a single aspherical lens may be used to focus more than one LED. Similarly, one cylindrical lens 206 is shown, although more may be used.

The aspherical lenses 204 provide focus in the y-direction and the cylindrical lens provides focus in the x-direction. Due to the asymmetric effect of the cylindrical lens on the emitted light 203, this results in the different focal lengths in the x- and y-directions. This will tend to "blur" the emitted light 203 in the x-direction, which facilitates viewing the light from the one-dimensional array of light emitters 202 as a two-dimensional pattern on a rolling-shutter-type optical sensor. By switching the LEDs 202 on and off at a frequency corresponding to (e.g., the same as or less than) the rolling shutter frequency, the pattern can be used to encode and transmit data.

Figure 3:
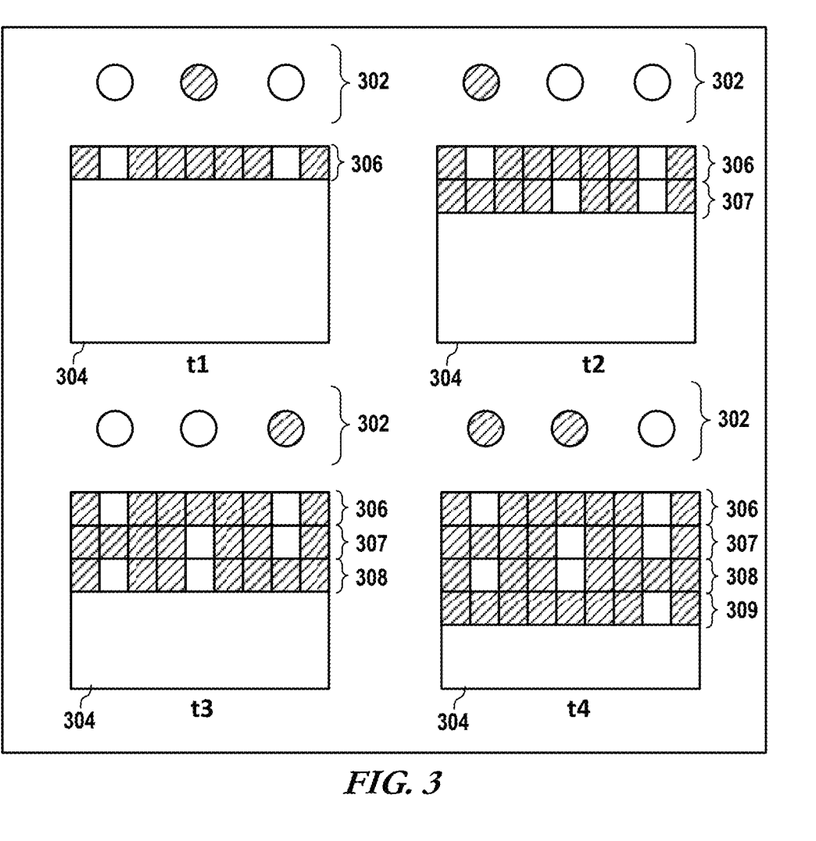
FIG. 3 is a block diagram illustrating data being encoded on a rolling-shutter-type optical sensor according to an example embodiment.

An example of how data can be encoded on a rolling-shutter-type optical sensor is shown in the block diagram of FIG. 3. In this example, each of an array of LEDs 302 are shown as shaded if turned off, and white if turned on. A rolling-shutter-type receiving sensor array 304, such as a complementary metal-oxide-semiconductor (CMOS) sensor, is exposed to the light from the LEDs 302. A rolling shutter sensor does not expose the whole frame at once, but instead scans each line of the frame. As a result, the line scanning frequency of the sensor is much higher than the frame rate of the sensor.

In the diagram of FIG. 3, the state of the LEDs 302 and receiving sensor array 304 is shown for each successive time t1-t4, each of which represents a time immediately after one row of the receiving sensor array 304 has been scanned. As with the LEDs 302, shaded pixels of the receiving sensor array 304 represent dark areas and white pixels represent light areas that have been exposed by a lit LED 302. At time t1, row 306 has been scanned; at time t2, row 307 has been scanned;

at time t3, row 308 has been scanned; and at time t4, row 309 has been scanned. As will be apparent, light and dark pixels in the columns of the sensor contain encoded data (e.g., binary ones and zeros, multi-bit values, analog data), which can be decoded by image processing circuitry coupled to the receiving sensor array 304.

Figure 4:
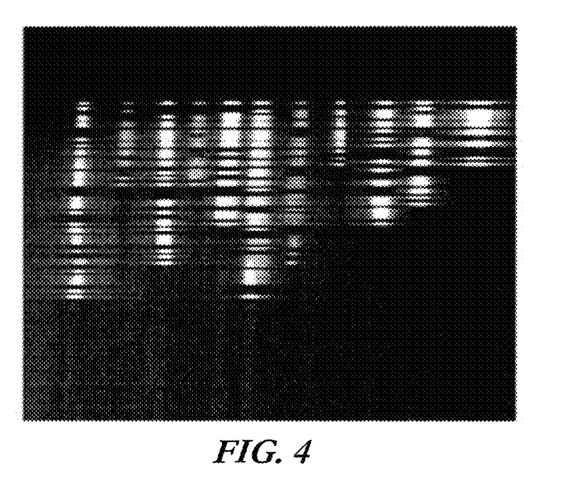
FIG. 4 is a video frame illustrating an example of encoded data captured by a rolling-shutter-type sensor array.

In FIG. 4, a video frame illustrates an example of encoded data captured by a rolling-shutter-type sensor array. In this example, 11 LEDs were used to encode data in the video frame. In the example of FIG. 4, camera optics that included an aspherical lens and cylindrical lens (as well as a slit mask) were used to achieve the illustrated effect where a single line of the scene is exposed on the sensor array for the duration of a frame. It has been shown that such an arrangement using 11 LEDs and a 25 fps rolling shutter camera can achieve theoretical data transfer rates of 32 Mbps. In the present embodiments, a similar effect is achieved as shown in FIG. 4, except that the aspherical lens and cylindrical lens are on the transmitting device, which facilitates detecting and encoding the data with unmodified (e.g., conventional) camera optics.

Figure 5:
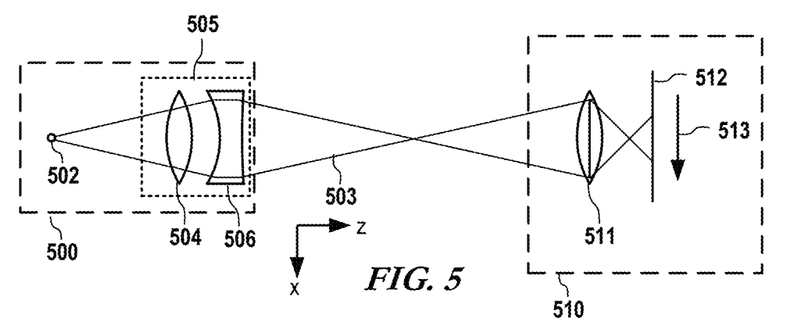
FIG. 5 is a block diagram illustrating a lens assembly being optically coupled to an array of light emitters in a x-direction according to an example embodiment.
Figure 6:
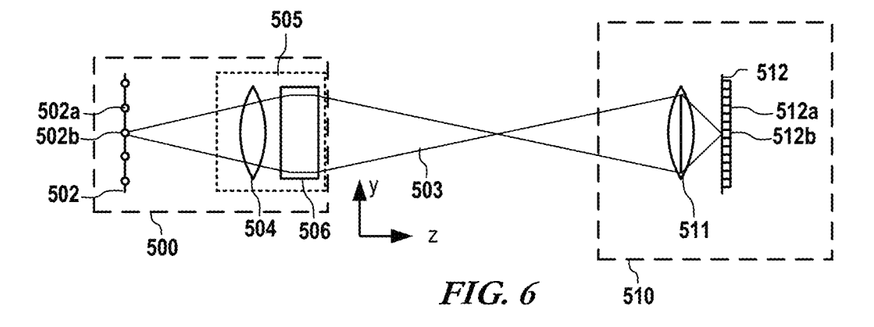
FIG. 6 is a block diagram illustrating a lens assembly being optically coupled to an array of light emitters in a y-direction according to an example embodiment.

In reference now to FIGS. 5 and 6, diagrams illustrate how lens assembly optically coupled to the array of light emitters focus light in the x- and y-directions in system according to an example embodiment. In FIG. 5, a transmitting device 500 includes a light emitter array 502 having light emitters arranged in a one-dimensional pattern, such as a line that is normal to the drawing page. Light 503 from the light emitter array 502 is launched into a lens assembly 505 that includes an aspherical lens 504 and a cylindrical lens 506.

A receiving device 510 includes a lens assembly 511 and a receiving sensor array 512 that receive the light 503. As represented by arrow 513, the receiving sensor array 512 scans rows (which are lines normal to the drawing page) from top to bottom. The cylindrical lens 506 of the transmitting device 500 causes the light 503 to be spread along the x-direction across a region of the receiving sensor array 512. Therefore, the light 503 will be captured in multiple rows scanned by the receiving sensor array 512.

By modulating the individual light emitters of the array 502 to illuminate in a pattern that changes at a rate corresponding to a rolling shutter of a receiving sensor array, data can be recorded onto the receiving sensor array 512. Generally, creating the pattern may involve activating or deactivating the LEDs in the array together during a period of time, with each turned on or off during the period of time to encode a different symbol of data. The activation of the pattern occurs at a rate f/N, where f is the row scan frequency of the receiving sensor array 512, and N=1, 2, . . . n. By selecting N>1, each symbol can be made to cover multiple rows of the receiving sensor array 512. This will reduce theoretical data rate, but may also reduce bit errors.

In FIG. 6, the same system is viewed from the yz-plane. The cylindrical lens does not substantially diffract the light 503 along the y-direction, and so each of the light emitters of light emitter array 502 will make a distinct image on the receiving sensor array 512. For example, there may be a one-to-one correspondence between the LEDs 502a-b and respective blocks 512a-b on the receiving sensor array 512.

The blocks 512a-b may represent one or more pixels of a currently active scan line of the receiving sensor array 512.

Figure 7:
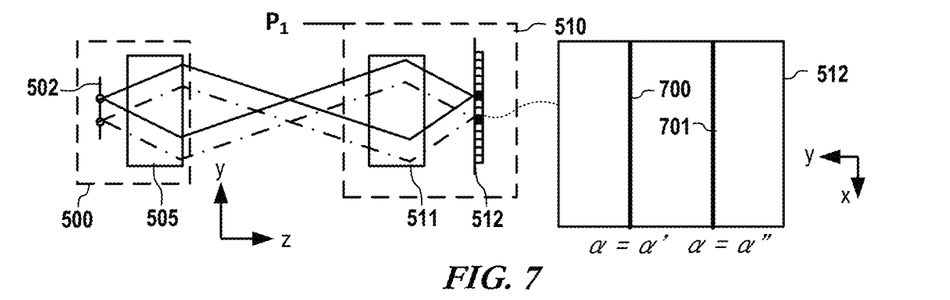
FIGS. 7 and 8 are block diagrams illustrating how translational offsets along the y-axis are manifested in the system of FIG. 6.
Figure 8:
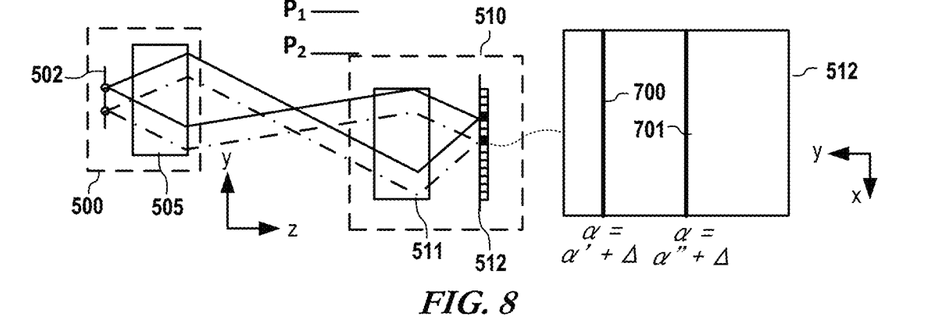

The system shown in FIGS. 5 and 6 will be able to handle some level of misalignment and mis-focus between the transmitting device 500 and receiving device 510. In FIGS. 7 and 8, block diagrams illustrate how translational offsets along the y-axis are manifested in the system of FIG. 6. In FIG. 7, receiving device 510 is at y-position $P_1$ relative to transmitting device 500. To the right, the xy-plane view of the receiving sensor array 512 shows two vertical lines 700, 701 corresponding to two of the light emitters of array 502.

In FIG. 8, the receiving device 510 is shifted downwards to y-position $P_2$ relative to the transmitting device 500. This results in a leftwards shift of the vertical lines 700, 701. The spacing between the lines 700, 701 will remain the same assuming the z-separation is unchanged and the xy-plane of the light emitter array 502 is parallel to the corresponding plane of the receiving sensor array 512. If there is some relative rotation about the x-axis between the light emitter array 502 and the receiving sensor array 512 (e.g., "yaw" movement of the transmitting device 500), then the spacing between the lines 700, 701 may change, e.g., be reduced. Similarly, separation distance between the light emitter array 502 and the receiving sensor array 512 will affect the spacing between the lines 700, 701, as well as number of pixels illuminated on the receiving sensor array 512 for each light emitter of the array 502.

In order to deal with shifting of the patterns on the receiving sensor array 512, some sensor arrays may allow choosing a region of interest (RoI) based upon the spread of the light from the light emitter array 512. For example, if the receiving sensor array 512 has a 1280×1024 resolution, the 1024 rows can be chosen on the sensor based upon the spread. If the spread is small, then a narrow RoI on the sensor is chosen. If the spread is large, then the RoI could be larger, potentially utilizing the entire sensor array. Generally, because blurs will be different based upon different location/orientation of the user, RoI can be chosen based upon z-direction separation distance between the transmitter and receiver. As will be described hereinbelow, the z-direction separation distance can be measured or estimated using distance sensing means such as a time of flight sensor.

Figure 9:
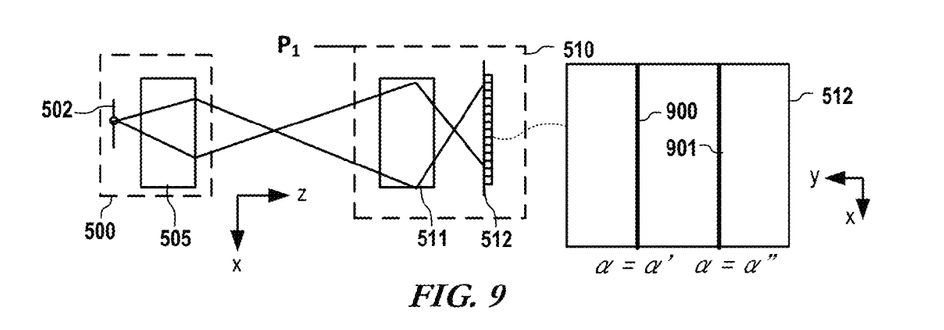
FIGS. 9 and 10 are block diagrams illustrating how translational offsets along the x-axis are manifested in the system of FIG. 5.
Figure 10:
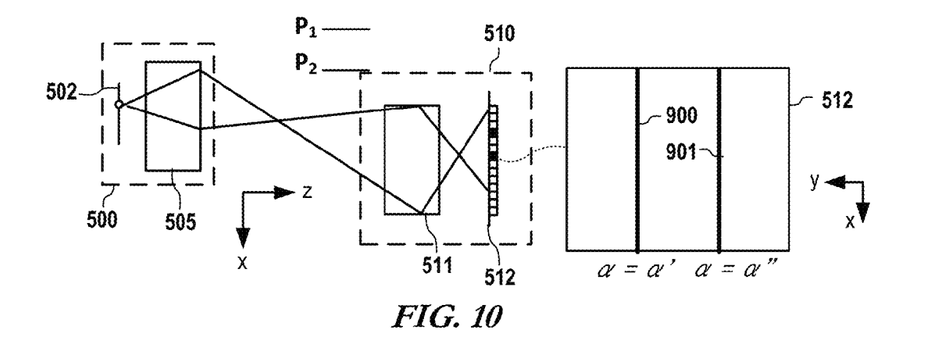

In FIGS. 9 and 10, block diagrams illustrate how translational offsets along the x-axis are manifested in the system of FIG. 5. In FIG. 9, receiving device 510 is at x-position $P_1$ relative to transmitting device 500. To the right, the xy-plane view of the receiving sensor array 512 shows two vertical lines 900, 901 corresponding to two of the light emitters of light emitter array 502. In FIG. 8, the receiving device 510 is shifted downwards to x-position $P_2$ relative to the transmitting device 500. Because the light of each emitter of array 502 is spread in the x-direction, this results in no shifting of the lines. Similarly, relative rotation about the y-axis between the light emitter array 502 and the receiving sensor array 512 (e.g., "pitch" movement of the transmitting device 500) will have minimal effect on the lines 900, 901 so long as the light emitter array 502 remains within the field of view of the receiving sensor array 512.

As previously noted, z-direction separation distance between optical transmitting and receiving devices can affect the y-direction separation distance between lines/columns of exposed pixels on the receiving sensor array 512. This may affect the ability to accurately distinguish between individual light emitters in an emitter array 502. In order to compensate for this, the transmitting device 500 may include distance sensing means for determining a separation in the z-direction between the transmitting device 500 and receiving device 510.

The distance sensing means may include a time of flight sensor (e.g., camera), that resolves distances based on return time of a light beam transmitted and reflected between two objects. Similar devices may measure round-trip times for other reflections, such as radio waves and sound. Other distance sensing means may include stereo/multiple cameras. Based on the measured distance, transmission characteristics of the light emitter array can be adjusted accordingly. An example of adjusting operation of a light emitter array responsive to separation distance according to an example embodiment is shown in the block diagram of FIG. 11.

Figure 11:
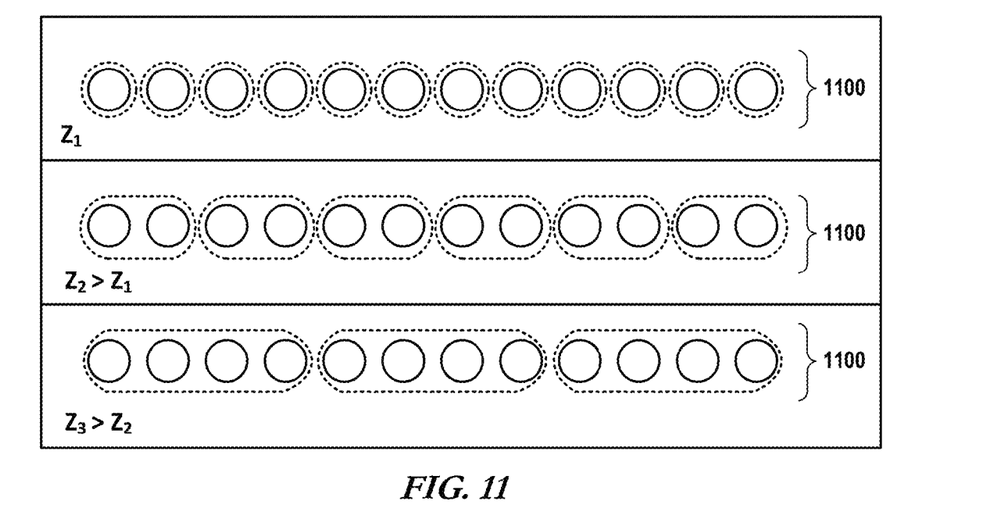
FIG. 11 is a block diagram illustrating changing resolution of a pattern of a light emitter array responsive to separation distance according to an example embodiment.

In FIG. 11, an array of light emitters 1100 are part of an optical transmitting device as described herein. In each block of the diagram, an illumination scheme is shown for different z-direction separation distances $Z_1$-$Z_3$. At distance $Z_1$, the conditions are such that each of the light emitters in array 1100 can be individually discerned. These conditions may include, among other things, focus and sensitivity of the receiving sensor, intensity of the light emitters, ambient light, and viewing angle. As indicated by the dashed outlines around each light emitter of the emitter array 1100 for distance $Z_1$, each light emitter can be independently illuminated, such that each can transmit one bit of data per scan line of the sensor. This example uses 12 light emitters, so this allows for 12 bits of data per scan line which is the highest resolution.

At distance $Z_2$, which is greater than $Z_1$, individual light emitters may not be reliably resolved. As indicated by the dashed line grouping adjacent pairs of light emitters, the pairs are used to transmit a single bit per scan line, resulting in six bits of data per scan line, which is a lower resolution than for $Z_1$. The grouping of pairs may involve illuminating one light emitter in the pair while the other is always switched off, or illuminating both light emitters of the pair together. Similarly, at distance $Z_3$, which is greater than $Z_2$, sets of four emitters are grouped together, resulting in three bits of data transmitter per scan line, which is a lower resolution than for $Z_2$. This grouping may involve illuminating less than four emitters in the group while the others are always switched off, or illuminating all four light emitters together.

It will be understood that the adaptive resolution scheme shown in FIG. 11 may be used to compensate for other factors besides z-direction separation, including rotation angles, ambient lighting, sensitivity of the receiving sensor array to wavelength and intensity of the transmitted light. It will be also understood that there may be many variations in adaptive grouping of emitters within the light emitter array 1100. For example, groupings of light emitters different than those shown may be used, e.g., groups of three, five, six, etc. Similarly, the group sizes do not need to be the same across the light emitter array 1100. For example, a larger grouping may be used for data that is less fault tolerant (e.g., text, protocol control data, error correction data), while a smaller grouping may be used simultaneously to transmit more fault tolerant data (e.g., streaming media). In other variations, some of the groupings may have all elements of the group illuminated together, while other grouping in the same array may have one or more light emitters switched off.

It should be noted that the receiving device may also have features that facilitate increasing reliability of optical data transmission. The receiving device may utilize automatic zoom, automatic aperture, filters, exposure control, adjustable resolution, etc. to increase readability of the light emitter array. This can be used to adjust focus, field of view, optical distortion, sensitivity, resolution, etc., if bit error rates exceed a certain level.

Figure 12:
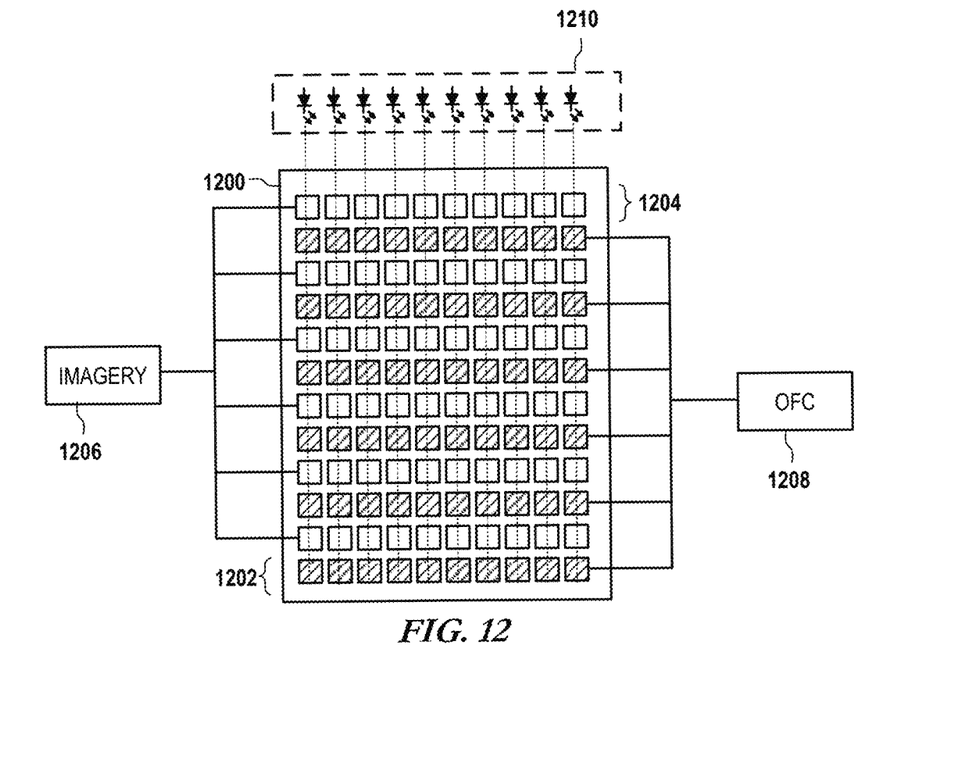
FIG. 12 is a block diagram of a sensor array usable in a receiving device according to an example embodiment.

In the illustrated embodiments, the use of asymmetric focal length optics on the transmitting device allows the receiving device to use existing cameras (e.g., off-the-shelf, unmodified, commercially available) to perform as optical receiving devices. Such devices may include features that allow simultaneous use as a visible imaging device and an augmented reality device that utilizes OFC light emitter arrays as described herein. In this case, "simultaneous use" involves presenting to the user the appearance that two different data types are being rendered at the same time, even if at a device level the data is being rendered in separate frames and/or interleaved between frames, e.g., using a rate that makes the interleaving imperceptible to the human eye. In FIG. 12, a block diagram illustrates a sensor array 1200 usable in a receiving device according to an example embodiment.

The sensor array 1200 includes first and second portions dedicated to simultaneously sensing OFC data and other optical data. In this example, the first and second portions include alternating rows of low-exposure pixels (e.g., shaded rows such as low-exposure row 1202) and high-exposure pixels (unshaded rows such as high-exposure row 1204). The sensor array 1200 utilizes a rolling shutter, such as where a single low-exposure row 1202 or high-exposure row 1204 are scanned at a time. In another embodiment, pairs of adjacent low-exposure rows 1202 and high-exposure rows 1204 can be scanned together, and coupled to different decoding circuitry during each scan. The low-exposure rows 1202 and high-exposure rows 1204 may be electrical and optical duplicates of each other, in which case the different exposure may be obtained by changing timing, voltage, etc., of the scanning signals. In another embodiment, the low-exposure rows 1202 and high-exposure rows 1204 may be electrically and/or optically different, such that the difference exposure levels will result in response to similar electrical activation signals.

The use of the low-exposure rows 1202 and high-exposure rows 1204 allows the sensor array 1200 to process two types of data simultaneously, e.g., OFC data and video. This simultaneous processing may involve parallel processing of the rows 1202, 1204, or may involve grouped or interleaved processing of the rows such that separate frames are produced in parallel or in series with one another. Data from the high-exposure rows 1204 is processed via a conventional imagery processor 1206, e.g., one that processes still photographs and/or video. Data from the low-exposure rows 1202 is processed via an OFC processor 1208 that decodes digital data transmitted a light emitter array 1210, or processes other augmented reality data from the light emitter array 1210. For example, the OFC processor 1208 may enable viewing a 2-D image painted by the light emitter array 1210 that would not be visible to the human eye.

Figure 13:
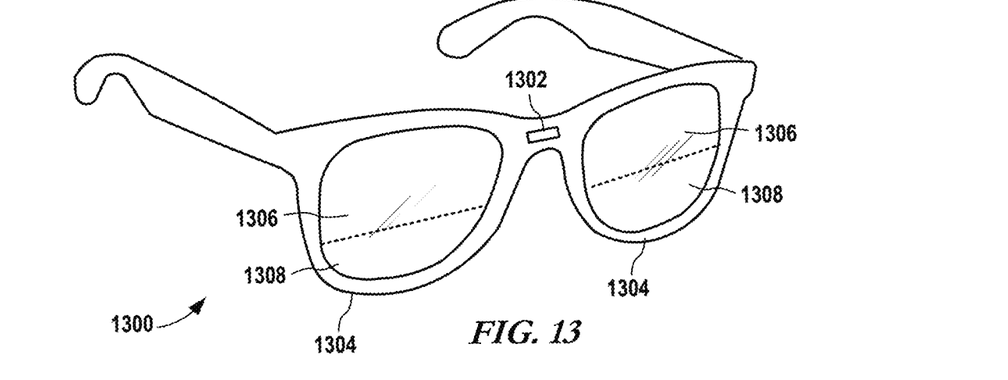
FIG. 13 is a perspective view of a receiving device according to an example embodiment.

The dual-purpose sensor array 1200 may be utilized in a receiving device that facilitates simultaneously displaying the two different types of data captured by the sensor 1200, e.g., OFC data and video. In FIG. 13, a perspective view illustrates an example of a receiving device 1300 according to an example embodiment. The receiving device 1300 is configured as a pair of eyeglasses. The receiving device 1300 is shown with a rolling-shutter-type camera 1302, although the camera 1302 or equivalent thereof may be located external to the receiving device 1300 and coupled via a wired or wireless data connection.

One or both of the eyepieces 1304 are configured as displays, e.g., that can display a translucent image on the otherwise transparent lenses. The display is divided into two display portions 1306, 1308 on one or both eyepieces 1304. The first display portion 1306 is used for conventional imaging, e.g., for overlaying a video feed from the camera and/or for other display options (e.g., user interface). The second display portion 1308 is used for OFC data display.

The first and second display portions 1306, 1308 may be driven simultaneously (at least as perceived by the user) by the camera 1302, e.g., by using alternating different-exposure scan lines as shown in FIG. 12. In another embodiment, two different cameras may be used to drive the first and second display portions 1306, 1308. The first and second display portions 1306, 1308 may be configured differently than what is shown here, e.g., different regions of the eyepieces 1304, each eyepiece wholly dedicated to a different type of imagery, can partially or fully overlap one another, etc. The second display portion can be enabled dynamically, e.g., when OFC communication mode is on. The rest of the time, both display portions 1306, 1308 can be used for conventional display purposes (normal camera viewfinder, maps, navigation, or other augmented reality data, etc.).

The second display portion 1308 may show data transmitted from a one-dimensional light-emitter array, such as decoded text, download progress, downloaded imagery, downloaded documents (e.g., web pages). The second display portion 1308 may also show undecoded imagery that would approximate what would be seen by the viewer if their eyes could process the optical data at the modulation frequencies used by the transmitting device. For example, an image such as shown in FIG. 4 could be superimposed on the second display portion 1308. This image could show, instead of the example encoded digital data, a static dot-matrix-type text or graphics display, animated text/graphics, video, etc. While this data may not need decoding per se, it may still involve image processing, e.g., integrating exposed pixels, modifying brightness and contrast, etc.

Similarly, OFC data can be augmented to a single display, such as a mobile camera viewfinder. For example, a user may point a camera at a billboard or other object that is transmitting OFC data, the OFC data can be augmented on the viewfinder, e.g., superimposed over the viewfinder image. The OFC mode may be automatically activated in such a case, such as via a machine readable code, NFC transmission, radio beacon, a light pulse pattern detectible by the conventional viewfinder application, etc.

The present embodiments are shown being incorporated in, among other things, wearable devices. It will be understood that transmitting and receiving devices as described can be used in a wide variety of devices and for a variety of uses besides transmission of data. For example, a single-line transmitting device may be used as video display showing images viewable at least by a rolling-shutter type of camera. If the displays become fast enough, e.g., a refresh rate on the order of 10K fps, then a single line the display may be visible using a camera having corresponding capture speed.

Figure 14:
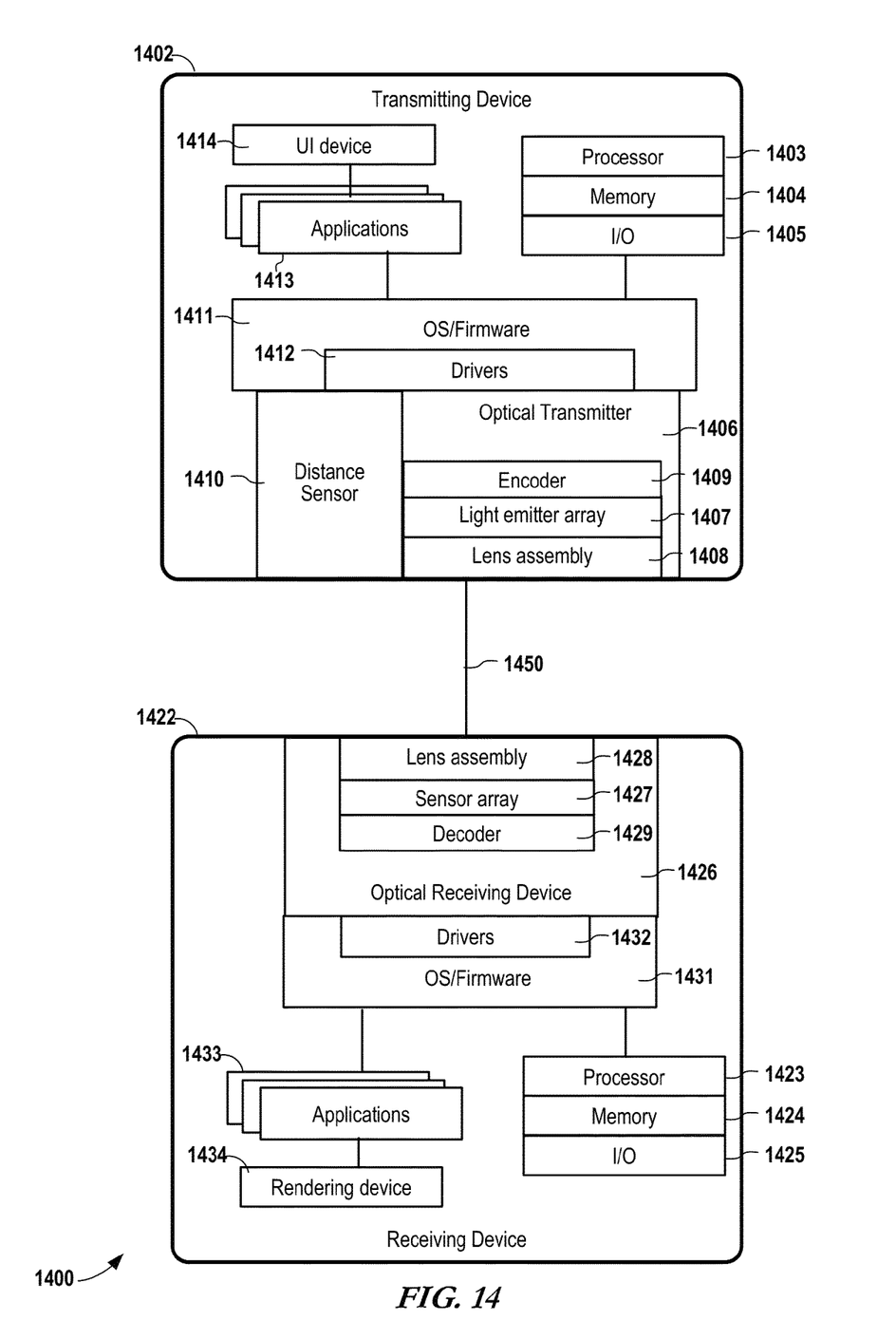
FIG. 14 is a block diagram of a system according to an example embodiment.

In reference now to FIG. 14, a block diagram shows a system 1400 according to an example embodiment. The system includes a transmitting device 1402 and a receiving device 1422. These devices 1402, 1422 may include any combination of wearable devices, user devices, mobile devices, infrastructure devices, etc. The devices 1402, 1422 generally include respective processors 1403, 1423, memory 1404, 1424, and input/output (I/O) circuitry 1405, 1425. The processors 1403, 1423 may be operable via instructions stored in the memory 1404, 1424, or may be configured as special purpose circuitry.

The transmitting device 1402 includes an optical transmitter 1406 that facilitates free-space transmission of light 1450 to the receiving device 1422. The optical transmitter 1406 at least includes an array of light emitters 1407 arranged single-file along an emitting surface of the transmitting device 1402. The single-file arrangement of the light emitter array 1407 may be along a line or curve, and generally forms a one-dimensional pattern. For example, if the elements of the light emitter array 1407 extend along a y-direction, then no two elements will overlap in the x-direction.

The optical transmitter 1406 also includes a lens assembly 1408 optically coupled to the array of light emitters 1407. The lens assembly 1408 includes at least one cylindrical lens and at least one aspherical lens. The lenses are arranged in such a way that a focal lengths of the transmitted light 1450 are asymmetric in two directions. So if the lens assembly emits the light 1450 in free-space along the z-direction and the elements of the light emitter array 1407 extend along a y-direction, the lens assembly causes the light 1450 to have a first focal length in the y-direction and a second focal length in an x-direction.

An encoder 1409 is coupled to the light emitter array 1407 and facilitates separate activation and deactivation of individual elements of the light emitter array 1407. In this way, each of the light emitters can simultaneously transmit a different part of the data signal. For example, each transmitted row may correspond to a transmitted word having a bit size less than or equal to the number of light emitters in the array 1407.

Additional bits may be used for parity or other error correction data. In another embodiment, each column corresponding to a light emitter in the array can be used for a different data word, the bit length corresponding to the number of rows transmitted per frame of the receiving device 1422.

The transmitting device 1402 may also include a distance sensor 1409 such as a time of flight camera, multi-element camera, lidar, etc. The distance sensor 1409 may be at a fixed distance from the optical transmitter 1406 so that an actual distance between the transmitting device 1402 and receiving device 1422 can be derived. Other position or orientation sensors may be included with the distance sensor 1409 or be separately included in the transmitting device 1402. Such other sensors may include a gyroscope, accelerometer, digital compass, etc.

The encoder 1409 may be configured to change a resolution of the pattern of the light emitter array 1407 in response to a z-direction distance detected by the distance sensor 1410. For example, changing the resolution of the pattern may involve turning off at least one light emitter of the array of light emitters and/or grouping at least two light emitters in the array of light emitters to operate together. Further discussion of changing pattern resolution is described in relation to FIG. 11.

The devices 1406-1410 may be controlled via the processor 1403 as known in the art. The devices 1406-1410 may be coupled to the processor 1403 and/or other control circuits via digital signal lines, analog signal lines, switching logic, etc. The transmitting device 1402 may include an operating system/firmware 1411 and associated drivers 1412. The operating system/firmware 1411 and associated drivers 1412 can be used to control various device 1406-1410, as well as performing some of the functionality. For example, some or all functions of the encoder 1409 can be performed in software.

In order to facilitate user selection and control of transmitted data, the transmitting device 1402 may include applications 1413 and one or more user interface devices 1414. The applications 1413 and user interface device 1414 facilitate user selection a variety of data types, content, and functionality associated with the optical transmitter 1406. The receiving device may have corresponding applications 1433 for receiving, using and/or rendering the content.

The receiving device 1422 includes an optical receiving device with at least a sensor array 1427 such as a CMOS rolling shutter sensor. A lens assembly 1428 may be used to focus incoming light. A decoder 1429 may be used to decode data in video frames captured by the sensor array 1427. The devices 1426-1429 may be coupled to the processor 1423 and/or other control circuits via digital signal lines, analog signal lines, switching logic, etc. The receiving device 1422 may include an operating system/firmware 1431 and associated drivers 1432. The operating system/firmware 1431 and associated drivers 1432 can be used to control various device 1426-1429, as well as performing some of the functionality. For example, some or all functions of the decoder 1429 can be performed in software.

In order to facilitate user selection and perception of received data, the receiving device 1422 may include applications 1433 and one or more rendering devices 1434. The applications 1433 provide a way for user to detect, render, and store data receiving via optical the optical receiving device 1426. The rendering device 1434 may include any combination of display, speaker, force feedback, haptic feedback, and other perceivable sensation perceived by a user.

Figure 15:
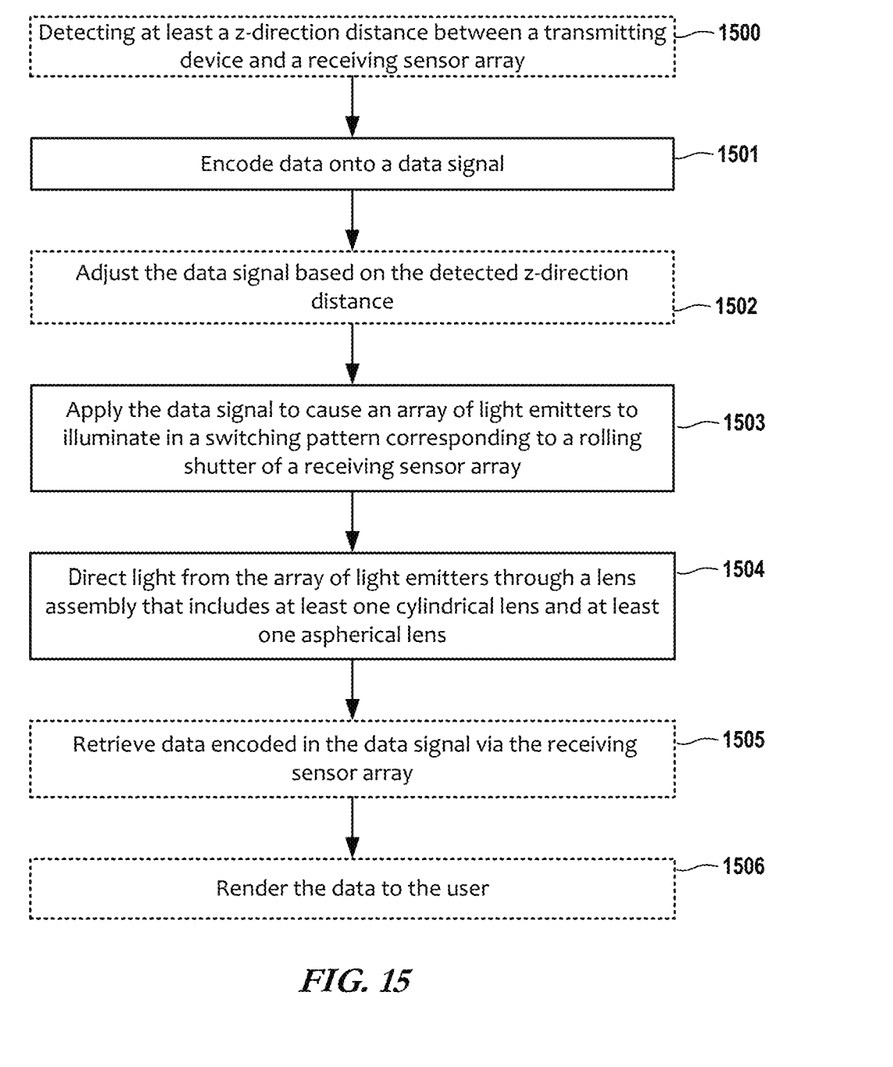
FIGS. 15 and 16 are flowcharts illustrating methods according to example embodiments.

In FIG. 15, a flowchart illustrates a method according to an example embodiment. The method may optionally involve detecting 1500 at least a z-direction distance between a transmitting device and a receiving sensor array. Data is encoded 1501 into a data signal, and the data signal may optionally be adjusted 1502 based on z-direction distance, if the distance is measured. For example, the signal may be adjusted to decrease a number of bits transmitted per row, and to adjust signals such that some light emitters are turned off and/or two or more emitters are grouped to operate together.

The data signal is applied 1503 to cause an array of light emitters to illuminate in a pattern at a rate corresponding to a rolling shutter of a receiving sensor array. The array of light emitters is arranged single-file along a y-direction of an emitting surface of a transmitting device. The light is emitted in a z-direction that is normal to the emitting surface. Light is directed 1504 from the array of light emitters through a lens assembly that includes at least one cylindrical lens and at least one aspherical lens. The lens assembly emits light in free-space along the z-direction and has a first focal length in the y-direction and a different, second focal length in an x-direction. The method may optionally involve retrieving 1505 data encoded in the data signal via the receiving sensor array, and rendering 1506 the data to a user.

Figure 16:
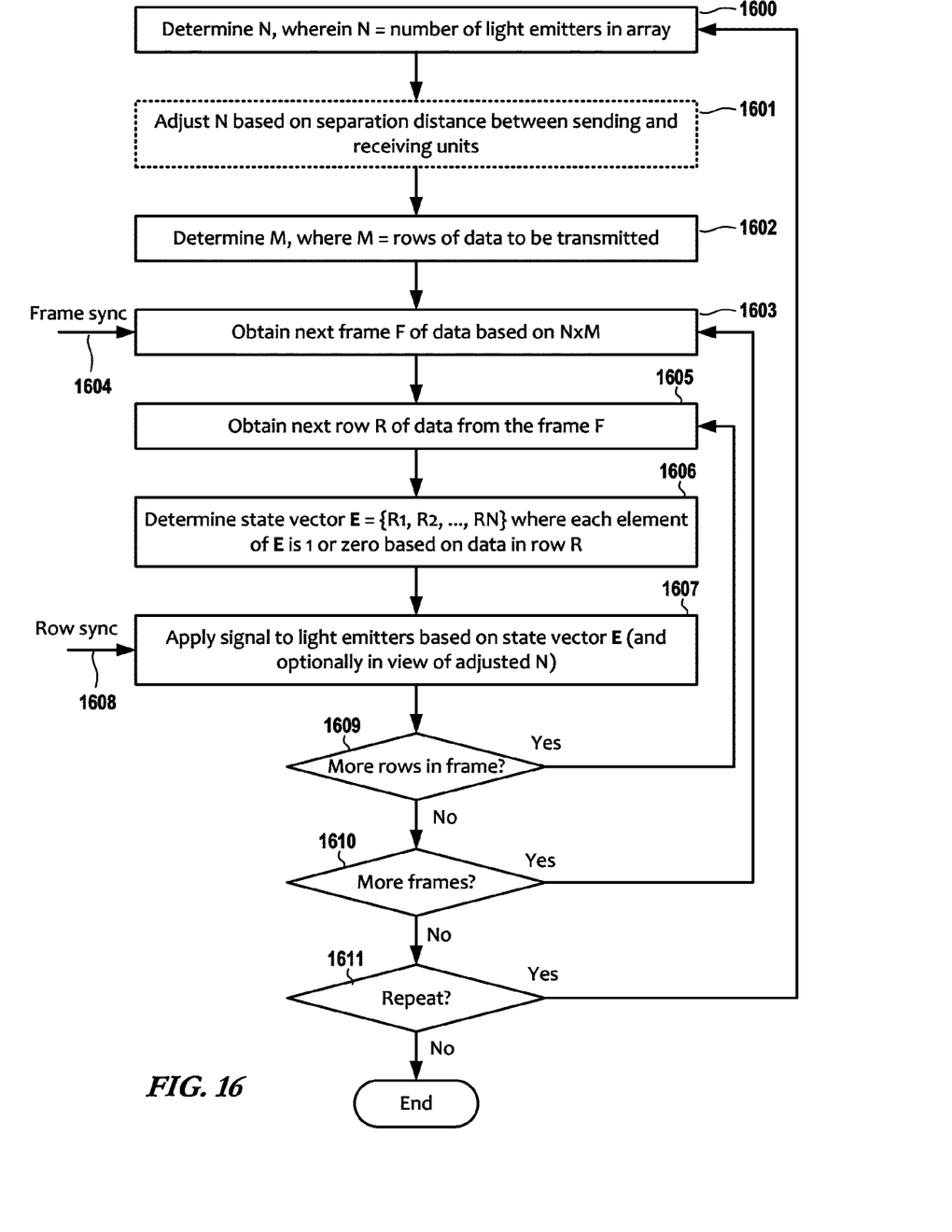

In FIG. 16, a flowchart illustrates a method for encoding data for transmission according to an example embodiment. The method involves determining 1600 a value of N, which corresponds to a number of light emitters in an array. The value of N may be hard coded, and/or determined at run-time, e.g., adjusted if a failed emitter is detected. The value of N may optionally be adjusted 1601 based on a separation distance detected between sending and receiving units. For example, if the light emitter array has 16 light emitters, only eight emitters of the array may be used (or eight groups of two emitters may act together) if it is estimated that the receiving device cannot resolve all 16 emitters.

The method involves determining 1602 M, which is the number of rows to be transmitted per frame. The value of M may be assumed based on minimum specifications of a receiving device, and may be adjusted based on a separation distance similar to N. In response to a frame synchronization signal 1604, the next frame of data is obtained 1603 based on N×M. The amount of user data in the frame may be less than N×M, e.g., to account for error correction codes or to account for data structure boundaries.

From the frame of data obtained at 1603, a row of data is obtained 1605. A state vector E is determined 1606 based on the data. For example, an example eight-bit state vector may be expressed as 10000001, and would be result in illuminating only the first and last emitters in the array for the current row R of data. A signal is applied 1607 to the light emitters based on this state vector, and may occur in synchronization with a row sync signal 1608. The decision blocks 1609 and 1610 cause an iteration to occur through each row in the frame, and through each frame of the data set being transmitted. The decision block 1611 may allow the data set to be repeatedly transmitted. Such repetition may be used to account for transmission errors if data is broadcast (e.g., no way to acknowledge successful receipt of data).

As previously noted, embodiments described herein may be used in a number of applications, such as billboards, automotive, location beacons, etc. Another application that may use for visible light communication is indoor navigation, which involves recognizing a given light source associated with a location. This can be achieved by transmitting a unique code, e.g., a location code, from a light emitter array. This may be analogous to as bar code, but is actively transmitted by light. The location code need not include an express location value such as latitude/longitude. The location code may be used as an index, e.g., to a table or database, that maps the code to a static or dynamic location.

The location code of an indoor navigation transmitter can be identified by a receiver within a predefined distance range (e.g., 2-3 m). For example, a user can direct a camera phone at an overhead light which contains a transmitting device as described herein. The transmitter sends a location code, allowing the camera phone to use the location. If this is at a restaurant, for example, this could allow the camera phone to automatically bring up an electronic menu for the restaurant (e.g., based on the code or based on its own location service), and then place an electronic order via the electronic menu. The transmitted location code is included with the electronic order, which allows the server to bring the order to the correct table.

In some applications, it may be desirable to identify the location in a secure fashion. Because a light transmitter as described herein can be dynamically changed, the light transmitters can send a time-varying code. This, coupled with a time stamp, can be used to derive the location via a location server device that generates and/or knows the sequence of the time-varying code.

In some scenarios, the light source may not cover the entire sensor outside of or at an extremum of the predefined distance range. For example, assume at maximum distance, light from an emitter array covers 60 lines out of a total available 720 lines on the receiving sensor in video mode. It has been found that patterns can be recognized even using a relatively small subset of the transmitted data range, e.g., by reducing the bit rate, number of bits per row, etc.

Conventional indoor lighting fixtures may include light transmitters as describe herein. This can increase the amount of data transmitted in an area. For example, if two light fixtures each transmitting with arrays having 16 light emitters, it may be possible to distinguish between 16*16 different fixtures. This may facilitate providing a unique identifier to each light source around the world. For smaller arrays, e.g., those with 8 or 4 emitters, a similar number of unique identifiers can be provided by capturing multiple rows (e.g., 2 or 4 respectively) in each frame using a rolling shutter sensor as described above.

There are many applications which can utilize the data transmitted in a single row and/or single frame by the light emitter array, e.g., by capturing and processing data in a single image. The above example of a device identifier is just one. In a single row or frames, fewer bits can be transmitted than respective frame or frame sequence. In such a case, the number of bits that can be transmitted in each frame can be increased by using a larger light emitter array. This may be useful in receiving devices such as mobile phones, which may skip frames and/or have challenges maintaining synchronization across frames.

The various embodiments described above may be implemented using circuitry and/or software modules that interact to provide particular results. The term circuitry refers to any of (a) hardware-only circuit implementations (such as implementations in only analog and/or digital circuitry); (b) combinations of circuits and software (and/or firmware), such as to a combination of processors and/or to portions of processor(s)/software (including digital signal processor(s), software, and memories that work together to cause an apparatus to perform various functions; and (c) circuits, such as a microprocessor(s) or a portions of a microprocessor(s) that use software or firmware for operation, even if the software or firmware is not physically present.

One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art. The instructions may be provided by a computer program, a computer program product, a non-transitory computer-readable medium, and/or a data structure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A system comprising:
   an array of light emitters arranged single-file along an emitting surface of a transmitting device and emitting light in a z-direction normal to the emitting surface, the array of light emitters aligned along a y-direction normal to the z-direction;
   a lens assembly optically coupled to the array of light emitters, the lens assembly comprising at least one cylindrical lens and at least one aspherical lens, the lens assembly emitting the light in free-space along the z-direction and having a first focal length in the y-direction and a different, second focal length in an x-direction resulting in a relatively smaller y-direction field of view and a relatively larger x-direction field of view; and
   an encoder coupled to apply a data signal to the array of light emitters, the data signal causing the array of light emitters to illuminate in a pattern that switches at a rate corresponding to a rolling shutter of a receiving sensor array.

2. The system of claim 1, wherein each of the light emitters simultaneously transmits a different part of the data signal.

3. The system of claim 1, further comprising a distance sensor that detects at least a z-direction distance between the transmitting device and the receiving sensor array, and wherein the encoder changes a resolution of the pattern in response to the detected z-direction distance.

4. The system of claim 3, wherein changing the resolution of the pattern comprises turning off at least one light emitter of the array of light emitters.

5. The system of claim 3, wherein changing the resolution of the pattern comprises grouping at least two light emitters in the array of light emitters to operate together.

6. The system of claim 1, wherein the second focal length in the x-direction causes the light to extend along columns of the receiving sensor array, wherein the rolling shutter advances row-by-row.

7. The system of claim 1, wherein the transmitting device comprises eyeglasses.

8. The system of claim 1, further comprising a receiving device comprising the receiving sensor array, the receiving device further comprising:
   a decoder coupled to retrieve data encoded in the data signal via the receiving sensor array; and
   a rendering device configured to render the data to a user.

9. The system of claim 8, wherein the receiving sensor array comprises first and second portions configured to sense the data encoded in the data signal and while simultaneously sensing other optical data.

10. The system of claim 9, wherein the rendering device comprises a display having first and second display portions simultaneously rendering the data encoded in the data signal and the other optical data.

11. The system of claim 10, wherein the receiving device comprises eyeglasses.

12. A method comprising:
    encoding data onto a data signal;
    applying the data signal to cause an array of light emitters to illuminate in a pattern that changes at a rate corresponding to a rolling shutter of a receiving sensor array, the array of light emitters arranged single-file along a y-direction of an emitting surface of a transmitting device and emitting light in a z-direction normal to the emitting surface; and
    directing the light from the array of light emitters through a lens assembly that comprises at least one cylindrical lens and at least one aspherical lens, the lens assembly emitting the light in free-space along the z-direction and having a first focal length in the y-direction and a different, second focal length in an x-direction resulting in a relatively smaller y-direction field of view and a relatively larger x-direction field of view.

13. The method of claim 12, wherein each of the light emitters simultaneously transmits a different part of the data signal.

14. The method of claim 12, further comprising detecting at least a z-direction distance between the transmitting device and the receiving sensor array, and wherein a resolution of the pattern is changed in response to the detected z-direction distance.

15. The method of claim 14, wherein changing the resolution of the pattern comprises turning off at least one light emitter of the array of light emitters.

16. The method of claim 14, wherein changing the resolution of the pattern comprises grouping at least two light emitters in the array of light emitters to operate together.

17. The method of claim 12, wherein the second focal length in the x-direction causes the light to extend along columns of the receiving sensor array, wherein the rolling shutter advances row-by-row.

18. The method of claim 12, further comprising:
    obtaining data encoded in the data signal via the receiving sensor array; and
    rendering the data to a user.

19. The method of claim 18, further comprising sensing the data encoded in the data signal via the receiving sensor array while simultaneously sensing other optical data via the receiving sensor array.

20. The method of claim 19, further comprising rendering the data encoded in the data signal while simultaneously rendering the other optical data.

* * * * *